(12) United States Patent
Brett et al.

(10) Patent No.: US 8,463,421 B2
(45) Date of Patent: Jun. 11, 2013

(54) DRILLING APPARATUS AND METHODS

(75) Inventors: Peter Brett, Birmingham (GB); Robin Taylor, Birmingham (GB); David Proops, Birmingham (GB); Chris Coulson, Birmingham (GB); Mansel V. Griffiths, Bristol (GB)

(73) Assignee: Aston University, Birmingham (GB)

( * ) Notice: Subject to any disclaimer, the term of this patent is extended or adjusted under 35 U.S.C. 154(b) by 565 days.

(21) Appl. No.: 12/308,672

(22) PCT Filed: Jun. 22, 2007

(86) PCT No.: PCT/GB2007/002345
§ 371 (c)(1),
(2), (4) Date: Sep. 16, 2010

(87) PCT Pub. No.: WO2007/148114
PCT Pub. Date: Dec. 27, 2007

(65) Prior Publication Data
US 2011/0020084 A1    Jan. 27, 2011

(30) Foreign Application Priority Data

Jun. 22, 2006  (GB) .................................. 0612452.3

(51) Int. Cl.
*G06F 19/00* (2011.01)
*B23B 35/00* (2006.01)
*B23B 39/00* (2006.01)

(52) U.S. Cl.
USPC ........... 700/175; 700/160; 700/168; 700/170; 700/173; 700/177; 700/188; 700/195; 408/1 R; 408/3; 408/9

(58) Field of Classification Search
USPC ................. 700/160, 168, 170, 172–175, 177, 700/188, 195; 408/1 R, 3, 9
See application file for complete search history.

(56) References Cited

U.S. PATENT DOCUMENTS
4,688,970 A    8/1987 Eckman

FOREIGN PATENT DOCUMENTS
EP    0 512 867    11/1992
WO    98/18390    5/1998

OTHER PUBLICATIONS

James M. Drake, et al., "Computer and Robotic Assisted Resection of Brain Tumors", IEEE, Apr. 7, 1991, pp. 888-892.*

(Continued)

*Primary Examiner* — Sean Shechtman
(74) *Attorney, Agent, or Firm* — Smith, Gambrell & Russell, LLP

(57) ABSTRACT

The present invention provides a method of drilling a hole in a workpiece in order to control breakthrough of the workpiece comprising the steps of: a) initiating contact between a drill bit of a drill unit and the workpiece; b) operating the drill unit to rotate the drill bit to drill the workpiece; c) during drilling of the workpiece measuring the force, F and torque, T, experienced by the drill bit; d) calculating a variable F', based on the measured force, F, representing the rate of change of F; e) calculating a variable, T' based on the measured torque, T, representing the rate of change of T; f) calculating a variable F" representing the rate of change of F'; g) calculating a variable T" representing the rate of change of T"; h) detecting the onset of breakout of the workpiece by use of the variables F', F", T' and T"; i) thereby controlling the speed of rotation of the drill bit during breakthrough of the workpiece to control the degree of breakout of the drill bit from the workpiece. A drilling system is also disclosed.

29 Claims, 14 Drawing Sheets

OTHER PUBLICATIONS

Baker, D. et al, "A Mechatronic Drilling Tool for Ear Surgery: A Case Study of Some Design Characteristics", Mechatronics, Pergamon Press, Oxford, GB, vol. 6, No. 4, Jun. 1, 1996, pp. 461-477, XP000587629.*

Combined Search and Examination Report under Sections 17 & 18(3) for GB0612452.3 dated Oct. 13, 2006.

PCT International Search Report (Form PCT/ISA/210) dated Apr. 2005 for PCT/GB2007/002345.

PCT Written Opinion of the International Searching Authority (Form/ISA/237) dated Apr. 2005 for PCT/GB2007/002345.

Allotta B et al, "Study on a Mechatronic Tool for Drilling in the . . . Experiments", Jun. 1, 1996, Mechatronics, Pergamon Press, Oxford, GB pp. 447-459, XP000587628.

Baker D et al, "A Mechatronic Drilling Tool . . . Characteristics", Mechatronics, Pergamon Press, Oxford, GB, vol. 6, No. 4, Jun. 1, 1996, pp. 461-477, XP000587629.

* cited by examiner

DRILLING APPARATUS AND METHODS

The present invention relates to an improved drilling system and methods of drilling which allow for controlled breakthrough of workpieces, especially compliant workpieces. In particular, the invention relates to a micro-drilling system developed to detect breakthrough and breakout and control the level of protrusion of a drill bit through a compliant work piece. The invention finds application in the field of surgical drilling as well as in the fields of drilling of other general materials such as plastics, metal, wood, laminates, rock, etc. The system lends itself well to the drilling of non-rigid and/or compliant materials as the tool is capable of self-referencing to the workpiece and as such can account for and compensate for movement and/or deflection of the workpiece. For surgical procedures this negates the need for pre-operative scan data usually required to define the tool path.

In the following, 'breakthrough' is used to refer to the overall process of drilling a workpiece. The term 'breakout' is used to refer to the point at which the far side of a workpiece is breached to start to form a hole through the complete thickness of the workpiece. It should be noted that the breakthrough process may or may not finish with breakout of the workpiece. In other words the current method and system may be used for forming through holes in workpieces and also closed holes having a thin section of workpiece material remaining at the far side of the workpiece.

When drilling many substances it is desirable to be able to control the overall breakthrough process and in particular how a drill bit breaks out the far side of a workpiece. For example, when drilling thin laminates or ceramics spalling can occur on breakout. Also, the drill bit may be advanced significantly beyond the far side of the workpiece leading to damage to neighbouring structures. One area of particular interest is the drilling of structures during surgery.

A particular problem in the field of surgery, but also found in other fields, is that the workpiece being drilled is often compliant. In other words the workpiece will flex during the drilling process.

There are many clinical applications where drilling through delicate regions of bone is required. When drilling in such regions it is necessary to exercise extreme caution when approaching tissue interfaces to prevent damage to sensitive structures that may lie beyond. Most conventional breakthrough detection techniques rely on a mechanical process that arrests drill rotation immediately after breakout has occurred. Such devices have been applied in neuro-surgical applications, power to the drilling tool is cut automatically as a result of the loss of cutting torque that occurs after break out. Although effective, these tools cannot detect the start of the breakout process and as such they cannot control the tool protrusion beyond the medial surface.

Cochlear implantation is one of the greatest advancements in recent years for the hearing impaired, it is currently the only treatment available for sensorineural deafness. The implant itself consists of a receiver and amplifier unit implanted behind the ear, connected to an electrode that passes through the mastoid into the middle ear where it enters the cochlear. An external microphone and signal processing unit is worn externally by the patient. The transmitter is placed over the implanted receiver and is held in place by a magnet, sound is then transferred to the implant via and inductive loop. Cochlear implant surgery is now a standardised procedure which consists of the following surgical steps:

(1) Post aural incision,
(2) Complete mastoidectomy,
(3) Posterior tympanotomy,
(4) Cochleostomy,
(5) Milling of the implant well,
(6) Insertion of the implant and electrode array,
(7) Closing the post aural incision.

The cochleostomy is a small hole (approximately 1.0 mm in diameter) drilled through the wall of the cochlear just above the round window, anterior to the oval window and inline with the long process of the incus. The use of these anatomical 'landmarks' enable the hole to be drilled into the basal turn of the cochlear, opening into the scala tympani. It is this hole through which the electrode of the cochlear implant is inserted.

Due to the dense nature of temporal bone and the location of the cochlear detailed scans are hard to perform and available data is very limited making pre-determination of the of the wall thickness and stiffness of the cochlear impossible. The bone of the cochlear is unique, it is much harder and more brittle than that of other bone tissue. The cochlear is fully formed at birth and as such cannot heal in the same way normal bone tissue does, rather a fibrous growth forms over any fracture. This can cause severe complications as the fibrous growth can invade healthy tissue, permanently changing the acoustic properties of the cochlear and also damaging any remaining nerve cells. This results in permanent loss of any residual hearing and can adversely affect the operation of the implant.

The cochlear is located deep within the skull, surrounded by temporal bone. Access to the cochlear is made via a complete mastoidectomy followed by posterior tympanotomy to expose the middle ear cavity. The facial recess is opened further to expose the cochleostomy site which is located above the round window, anterior to the oval window. Access to this area is restricted and does not lend itself well to accurate cochleostomy positioning. The size of the working envelope and surrounding anatomy can vary greatly from person to person. Great care must be taken to avoid sensitive structures for example, the facial nerve and the semi-circular canals as preventing damage to these structures is vital.

The location of the cochleostomy is very important for successful implantation to ensure electrode is inserted atraumatically and remains in the correct position. For a machine, these factors and this level of uncertainty is a considerable challenge and requires a simple and reliable sensing method combined with precise positional control. In practice the tool has also has to be used in conjunction with a binocular surgical microscope, and needs to be located on the appropriate trajectory by the clinician.

Allotta et al. ('Study on a mechatronic tool for drilling in the osteosynthesis of long bones: tool/bone interaction, modelling and experiments.' Mechatronics, 6(4), pp 447-459, 1996) successfully developed a technique for detecting and controlling breakthrough when drilling rigid bones using force transients. Allotta's drilling system detects the final penetration of bone tissue when it occurs. Controlling breakout means that it stops. It does not control breakout. The system of Allota does not detect the changing state of the structure immediately prior to the toolpoint reaching the tissue interface and as a result cannot control the extent of breakout neither can it be used to enable the toolpoint to reach the tissue interface whilst avoiding any breakout altogether through this flexible layer.

In practice, the matter is complicated by the presence of compliance and/or inconsistencies in the bone structure. Other automatic systems for controlling tool penetration of various tools through soft and flexible tissue interfaces have been presented for tissues with different deformation characteristics. These systems can be distinguished from the present invention in that the tools are guided by preoperative scan data. Scan data is gathered prior to the procedure and is used to generate a tool path for the robotic tool. Before the procedure is begun, the tool is registered to the anatomical features of the patient, the tool is then initialised and follows its predefined path until the procedure is complete. Application of these systems relies on the assumption that the location of the target and surrounding tissues remain in the same position as when the scans were performed and that the target itself is not affected by the tool action. Drake et al, 'Robotic and computer assisted resection of brain tumours.', Proceedings of Fifth Int. Conf. on Advanced Robotics (ICAR), pp 888-892, Pisa, Italy, 19-22 Jun., 1991, is an example of such a system.

When drilling compliant workpieces there is the additional problem of accounting for deflection of the workpiece during the drilling process. It has been found that the compliance of the workpiece affects the breakthrough process, in particular as the drill bit approaches the far side of the workpiece. During initial stages of drilling the compliant workpiece flexes under the force applied by the drill bit along the longitudinal axis of the drill bit. The axial loading from the drill bit is reacted by the material of the workpiece in front of the drill bit face. As the drill bit approaches the far side of the workpiece (e.g. the tissue interface in the example of drilling bone) the thinning of the workpiece immediately ahead of the drill bit leads to greater compliance and the inability to react the axial feed loads applied by the drill bit. It has advantageously been found that this has two effects. Firstly, the feed forces persistently decrease as the thinning material becomes unable to react the feed forces. Secondly, deformation of the workpiece in front of the drill bit leads to persistently increasing torque as the centroid of the reaction force moves to a greater radius. Other factors resulting from additional deformations and behaviour of the thinning structure add to this trend. Some factors may be material-dependent, e.g. deformation of thin structures of plastic may be different to deformation of thin bone structures.

According to the present invention there is provided a method of drilling a hole in a workpiece in order to control breakthrough of the workpiece comprising the steps of:

a) initiating contact between a drill bit of a drill unit and the workpiece;

b) operating the drill unit to rotate the drill bit to drill the workpiece;

c) during drilling of the workpiece measuring the force, F, and torque, T, experienced by the drill bit;

d) calculating a variable F', based on the measured force, F, representing the rate of change of F;

e) calculating a variable, T', based on the measured torque, T, representing the rate of change of T;

f) calculating a variable F" representing the rate of change of F';

g) calculating a variable T" representing the rate of change of T';

h) detecting the onset of breakout of the workpiece by use of the variables F', F", T' and T";

i) thereby controlling the speed of rotation of the drill bit during breakthrough of the workpiece to control the degree of breakout of the drill bit from the workpiece.

The use of the claimed method and system introduces many benefits over conventional drilling techniques:

(1) Repeatable tool positioning and trajectory,
(2) Controlled tool motion,
(3) Controlling the degree of protrusion (if any) beyond the far surface of the workpiece,
(4) Precisely formed hole of the correct size.

The invention is applicable when drilling workpieces at a variety of angles and not only when the drill bit is orientated normally to the surface of the workpiece. For example, successful drilling of bone workpieces at an angle of up to 40 degrees from normal has been demonstrated. In particular the onset of breakout can be detected using the variables F', F", T' and T" before breakout (i.e. perforation of the far surface occurs). This allows sufficient time to control the final stages of drilling to arrive at the required hole shape and required degree of drill bit protrusion (if any) from the far surface.

Another great benefit of the present invention is that the method and system may be used with the drill unit mounted to a rigid or semi-rigid support, or with the drill unit hand held. The ability to be able to hand hold the drill unit is only possible since the control strategy and sensing regimes employed by the invention allow for self-referencing of the drill bit and do not rely on knowing the absolute relative spatial positions of the drill bit and workpiece. This has practical advantages. For example, the workpiece does not need to be rigidly retained during the drilling process; the position of the drill unit may be adjusted manually; the system may be used partly in a mounted mode and partly in a hand held mode during a single drilling operation; the drill unit may more easily access awkwardly shaped workpiece locations; the drill system may be used where a mount, such as a theatre mount, is unavailable; there is no need for a predetermined tool path to be plotted before drilling.

Where the method is used for a cochleostomy, for example, the benefits include minimising or preventing protrusion into the cochlear therefore potentially allowing the endosteum to be left intact with consequential reduced fluid leakage.

The tool can be considered autonomous as it possesses the ability to self-reference to the deforming compliant workpiece. The drilling system is autonomous as it detects and discriminates different states occurring between the drill bit and the material of the workpiece and then selects and executes a drilling strategy accordingly. In the field of surgery, this makes the use of pre-operative scan data unnecessary as the tool can adapt and compensate for any deformation. The sensory scheme employed estimates the drilling parameters allowing the accurate prediction of the onset of drill breakout. When the onset of breakout is detected a control strategy is implemented to achieve the degree of protrusion (if any) required to complete the hole to the desired depth.

Advantageously, the drill system and method allow for accurate drilling of compliant materials since the system is able to account for imposed deflection of the workpiece and still accurately detect the onset of drill breakout.

Preferably, the onset of breakout of the workpiece is detected when both of the following criteria are satisfied:

$$F'_n < F_{lim} \text{ AND } F''_n \leq 0$$

$$T'_n > T_{lim} \text{ AND } T''_n \geq 0$$

where $F_{lim}$ and $T_{lim}$ are predetermined thresholds based on the desired hole depth, minimum level of protrusion and the workpiece's material properties.

Advantageously, F' and T' are the mean deviation magnitudes of F and T respectively.

Variables F' and T' may be calculated using filtered values of F and T respectively, wherein F and T are filtered using a non-recursive n-sample moving average filter to produce variables $\bar{F}$ and $\bar{T}$.

The mean deviation magnitude of F may be represented by:

$$F'_n = \overline{F}_n - \left(\frac{1}{j}\sum_{i=n-j}^{n}\overline{F}_i\right).$$

The mean deviation magnitude of T may be represented by:

$$T'_n = \overline{T}_n - \left(\frac{1}{j}\sum_{i=n-j}^{n}\overline{T}_i\right).$$

F" may be represented by:

$$F''_n = F'_n - \left(\frac{1}{j}\sum_{i=n-j}^{n}F'_i\right).$$

T" may be represented by:

$$T''_n = T'_n - \left(\frac{1}{j}\sum_{i=n-j}^{n}T'_i\right).$$

Advantageously the method further includes the step of measuring the linear displacement of the drill bit.

Preferably, on detection of the onset of breakout of the workpiece, the drill bit is retracted until F equals zero.

Subsequently drilling of the workpiece may be recommenced and the drill bit may be advanced by a fixed linear distance in order to complete the hole to a desired depth or percentage of hole completion.

Preferably the fixed linear distance is calculated as a proportion of a characteristic dimension of the drill bit. For example, the fixed linear distance may equal the radius of a burr of the drill bit where the burr is substantially hemispherical or spherical.

Preferably, immediately after step a) the drill bit is retracted until F is less than or equal to 0.01 N to thereby ensure the drill bit is accurately located at the surface of the workpiece.

Preferably, immediately after step a) the drill bit is advanced a fixed distance and the force experienced by the drill bit is detected in order to calculate the compliance of the workpiece.

Preferably a hybrid control strategy is implemented wherein the drill bit is initially advanced at a constant feed rate until either the onset of breakout is detected or a predetermined maximum threshold force is experienced by the drill bit; where the predetermined maximum threshold force is experienced by the drill bit the drill bit is thereafter advanced at a constant feed force.

The drilling of the hole may stopped with no breakout. Alternatively, the drilling of the hole may be stopped after a partial or complete through hole is formed. Thus, advantageously the ability to detect the onset of breakout allows a user to carefully control the geometry of the final hole and minimise the risk of any unwanted protrusion of the drill bit.

The drill unit may be hand-held.

The present invention also provides a drilling system comprising a drill unit and a controller; the drill unit comprising:

i) a drill bit,
ii) a force sensor for sensing a force, F, experienced by the drill bit; and
iii) a torque sensor for sensing a torque, T, experienced by the drill bit;

the controller comprising:

a) processing means programmed to calculate a force variable, F', based on the rate of change of the sensed force, F, a torque variable, T', based on the rate of change of the sensed torque, T, a variable, F", based on the rate of change of F', and a variable, T", based on the rate of change of T';

b) velocity control means for controlling the speed of rotation of the drill bit dependant on the variables F', F", T' and T".

The drill unit may further comprise a linear actuator for providing controlled linear movement of the drill unit when the drill unit is mounted to a support.

Alternatively the processing means and the velocity control means may allow the drill unit to be hand held in use.

The force sensor may comprise a non-contact deflection sensor.

The torque sensor may comprise means for detecting motor velocity and motor current.

The term drill bit refers to rotatable members. For example, the drill bit may include cutting surfaces or faces to remove material during rotation. For example the drill bit may be a surgical micro-drill bit for drilling bone. Other examples include twist drill bits and augers. However, the drill bit may instead comprise a rotatable boring member which may or may not produce cuttings or shavings of waste material. For example, the drill bit may comprise a needle or other member capable of rotating in order to bore a hole.

The present invention provides an advantageous drilling method and system that can be used in a wide area of applications. The invention provides particular application in the field of surgery, particularly micro-surgery, where the drilled workpiece is bone material and in the following description the invention will be illustrated, by way of example only, in this field. However, the invention can also be applied to other drilling applications such as the drilling of wood, laminates and metal in the building, manufacture and maintenance fields and well as the drilling of rock in the mining or exploration fields.

An embodiment of the present invention will now be described, by way of example only, with reference to the accompanying drawings in which.

SYSTEM ARCHITECTURE

Figure 1:
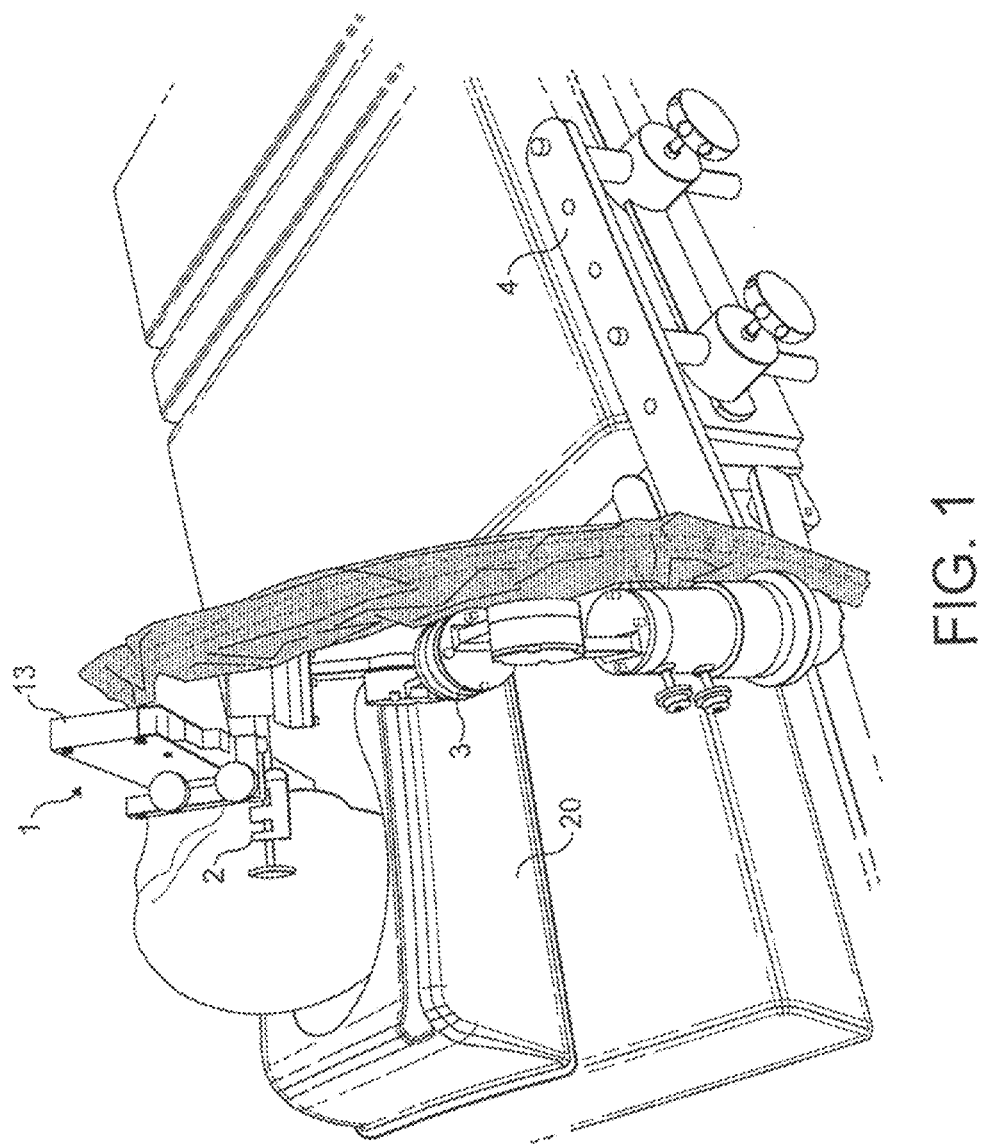
FIG. 1 is a perspective view of the drilling system of the present invention.

The main mechanical elements of the drilling system are depicted in FIG. 1. The Figure shows the drill unit 1, adjustment mechanism 2, locking arm 3 and theatre mount 4, mounted on a standard operating table, for example the Eschmann MR.

Figure 14:
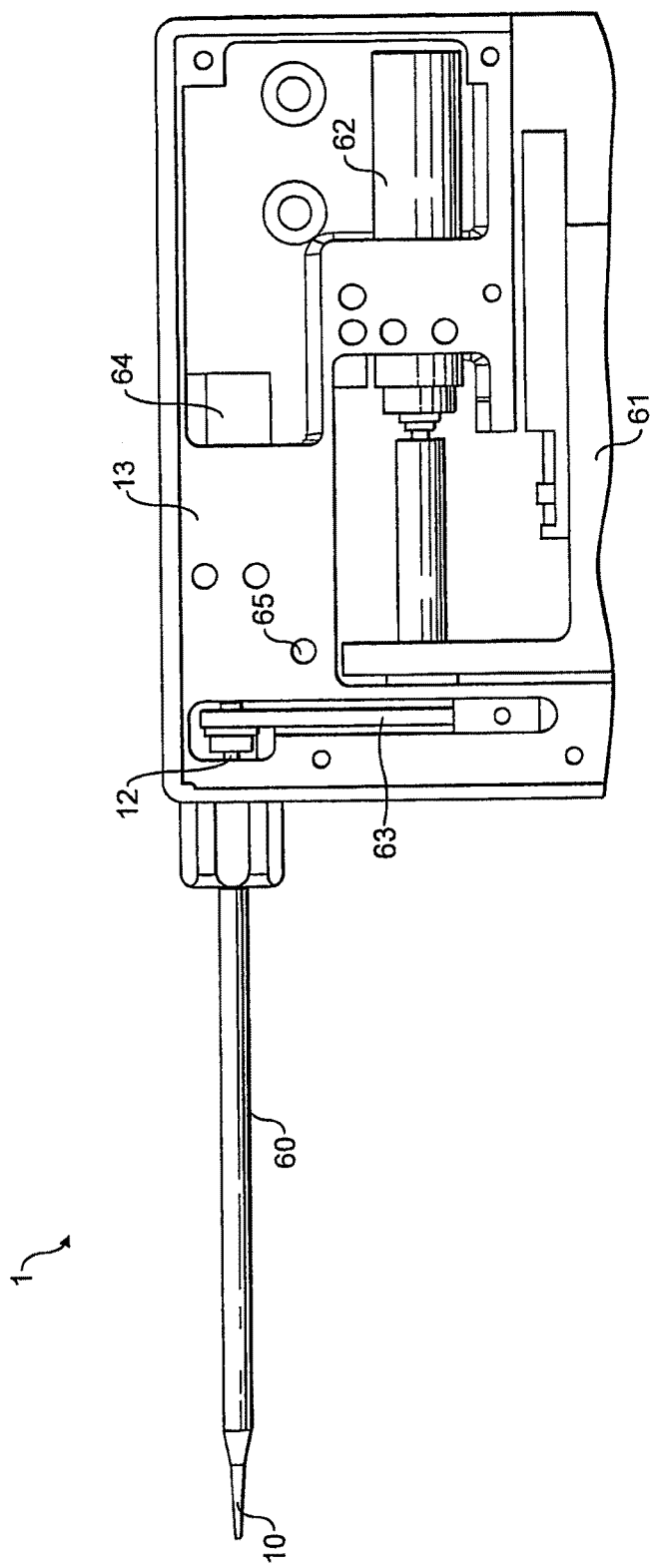
FIG. 14 is a schematic view of a drill unit of the present invention.

The drill unit is shown in FIG. 14. The unit comprises the drill bit 10 which is mounted to a 75 mm long drill shaft 12 which rotates within a separate drill shaft sheath 60 to minimise the risk of sensitive structures coming into contact with any rotating surfaces. The drill shaft 12 is rotatably mounted to a drill unit housing 13 and rotated in use by a drill drive motor 64. A cantilever 63 is mounted at one end to the housing 13 and at the other end to the drill shaft 12. A non-contact force sensor 65 is located in proximity to the cantilever 63 to detect forces experienced by the drill bit 10 as indicated by deflection of the cantilever 63. In the present example the detected force is in a direction along the longitudinal axis of the drill shaft 12.

Alternative force detection sensors which could be used include miniature load cells, piezo elements or strain gauges. The compliance of the force sensing arrangement has the advantage of assisting in the detection of the onset of breakout as it assists in the detection of differential tissue interfaces leading up to breakout. In particular the compliance enables a range of tissue stiffnesses to be detected and their variation leading up to the onset of breakout. The compliance also assists in greater control of the breakout of the drill bit.

Torque experienced by the drill bit 10 is detected using a combination of a velocity and motor current feedback from drill drive motor 64. Typical motor voltage characteristic can be expressed using:

$$V = K_v \times \omega + I \times R$$

Where V is the voltage, $K_v$ is the motor voltage constant, $\omega$ is the angular velocity, I is the current and R is the resistance of the stator windings. It can be seen that the velocity is dependent upon the voltage applied across the motor. However, at low velocities, such as are commonly used in surgical applications, the current contribution exceeds the velocity term making it more important to control the motor current. It has therefore been found that for accurate control it is necessary to use both velocity and motor current feedback. Using both parameters it has been possible to obtain accurate velocity control of within 0.1 rotations per second whilst maintaining torque signal integrity. Torque measurement may alternatively be provided by means such as an idler gear and cantilever, torque transducer or by optical methods.

The housing 13 is mounted (when not used in a hand-held mode) to the theatre mount by means of a bracket 61. A linear actuator 62 comprising a drive motor, gear box and lead screw are operatively connected to the bracket 61 so as to enable precise linear movement of the housing 13, and hence the drill bit 10, relative to the theatre mount. The drill bit 10 can be driven linearly with a resolution of <1 μm. The drill bit 10 itself is a standard 1.0 mm tungsten carbide dental burr 11. The unit also has a slim envelope to aid visibility when working via an operating microscope. The structures of the drill unit 1 are all contained within the housing 13, with only a single cable going to the control unit.

The locking arm 3 is self powered via an integrated gas supply and is free to move but self supporting when unlocked and completely rigid when locked. The arm 3 locks with no backlash meaning the surgeon can move the arm into position then be free to check the drill unit orientation, when satisfied, the arm can be locked and provide a rigid base for the system to operate from.

The system has been designed to be used in a surgical environment and as such, all exposed parts of the drill are removable and sterilisable. The drill unit 1 can be used with a standard operating microscope with a 200-300 mm focal length lens. This allows sufficient clearance between the drill unit 1 and the microscope to easily operate the drill and view the target area. The adjustment mechanism 2 allows the clinician to easily adjust the trajectory of the drill over approximately a 5 mm radius while viewing the target area via the microscope. A standard gel head rest 20 is also shown, into which the patient's head is placed. The gel head rest 20 offers sufficient support to enable optimal drilling. Advantageously, it is not necessary to clamp or strap the patient into position.

Figure 2:
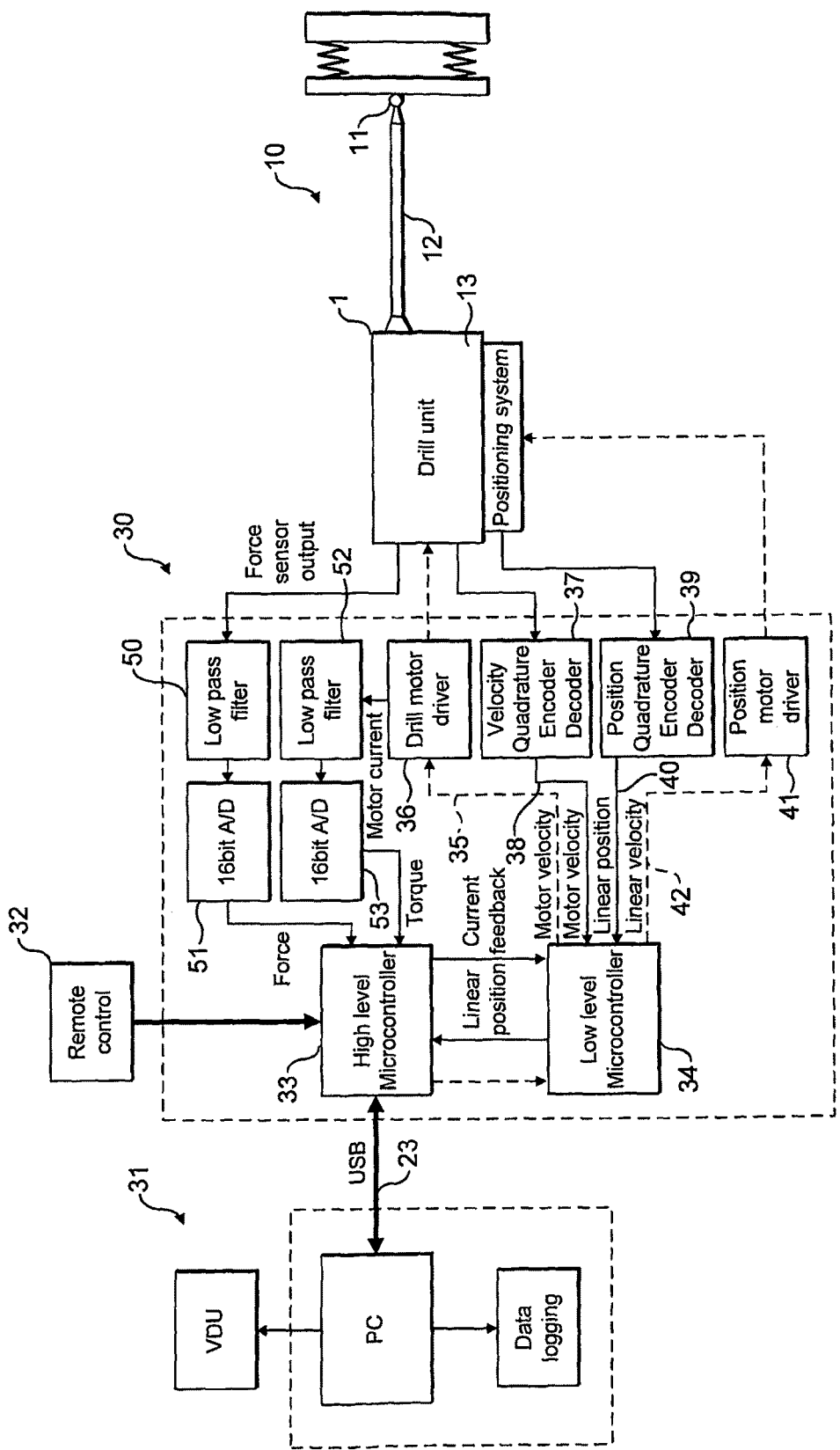
FIG. 2 is a schematic representation of the drilling system of FIG. 1.

The final parts of the system are the control unit 30, computer 31 and a hand held unit 32 from which the clinician operates the drill. These are shown schematically in FIG. 2. The computer 31 is used simply as a means of displaying and storing acquired data and is connected to the controller 30 via a connection 23 operating a standard protocol such as Universal Serial Bus (USB). Any other form of visual display unit would suffice. The control unit 30 is a dedicated hardware controller which handles all control functions and data analysis. The system monitors the force and torque from the tool point via sensors incorporated into the drill unit. This information allows the control unit to derive the state of the drilling and accurately predict the onset of breakout, at which point a control strategy is implemented to minimise or prevent protrusion of the drill bit 10 beyond the medial surface.

The control unit 30 is divided into two parts, the high level controller 33 and the low level controller 34. Both are independent of each other working in parallel to control the system. The low-level controller 34 is a dedicated hardware controller running on a Microchip PIC18F4620. This operates all drive systems and mechanical elements of the drill. A motor velocity output 35 from the low level controller 34 is connected to a drill motor driver 36. The drill motor driver 36 controls the velocity of the drill motor. A velocity quadrature encoder decoder 37 receives velocity information from the drill unit 1 and provides the information to the low level controller 34 via motor velocity input 38.

A position quadrature encoder decoder 39 receives position information from the drill unit 1 and provides the information to the low level controller 34 via linear position input 40. A position motor driver 41 of the controller is connected to a positioning system 43 of the drill unit 1. The positioning system comprises the linear actuator described above. The position motor driver 41 is controlled by means of linear velocity output 42 of the low level controller 34. The low level controller 34 thus contains two PID control loops which monitor and maintain the drill rotational velocity and linear actuator position. Velocity and position commands originate from the high-level controller 33 and the low-level controller 34 executes them independently. This means that the higher level functions are not affected by low level hardware tasks.

The high-level controller 33 performs the 'higher' level functions of the system such as data capture and handling, data analysis and communication with the both the computer 31 and the clinician's remote control 32. The high level controller 33 receives force information from a force sensor in the drill unit 1 via a low pass filter 50 and 16 bit analogue-to-digital (A/D) converter 51. The high level controller 33 receives torque information from the drill motor driver 36 via a low pass filter 52 and 16 bit A/D converter 53.

One of the main high-level controller functions is searching for the characteristics in the sensory data that indicate the onset of the breakout process. The high-level controller 33 responds to the key states of the drilling process by selecting pre-determined strategies based on the expected sequence of stages and the interpreted state of the drilling process. Factors such as tissue stiffness, hardness and the cutting parameters are evaluated to reflect how the system needs to respond at the onset of breakout. This also enables the system to estimate the state of cutting conditions and efficiency as these are important with respect to tissue heating.

All functions are completely independent of the computer 31 as this is simply a visual display unit for the clinician and a means of recording data. This ensures the system operates as close to real-time as possible and does not have to rely on a potentially unstable operating platform. Progress of the procedure is relayed to the clinician who is able to override the process at any time via the hand-held remote 32.

Drilling Characteristics and Modelling

In order to accurately predict drill breakout it is necessary to understand the key stages of the drilling process. It is possible to model the force and torque characteristics by breaking the process into a series of stages based on the geometric progression of the drilling process. The stages are listed below.

(1) the start of drilling,
(2) hole depth is equal to the radius of the burr,
(3) start of equilibrium drilling,
(4) onset of breakout,
(5) completion of the hole, However, some of these stages will not occur in that order if at all depending on the conditions at the tool tip. For example if the wall thickness is less than the radius of the burr then it will not be possible to reach stage (2).

Figure 3:
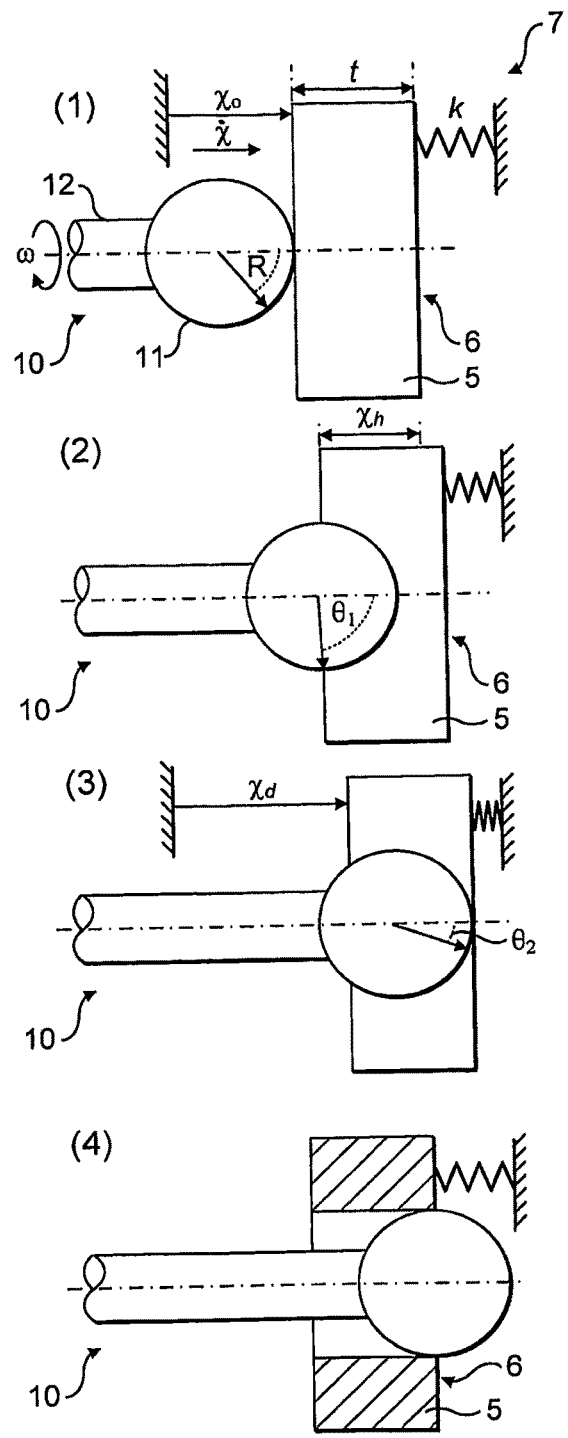
FIG. 3 is a schematic representation showing a drill bit of the present invention at various stages during drilling of a workpiece.

When the feed rate equals the rate of material removal is termed as the 'equilibrium drilling point'. This condition is rarely reached as only materials with a high stiffness achieve sufficient feed force and as such it would be undesirable in a surgical procedure. However, this is not the case for constant feed force control strategies (this will be discussed in more detail at the end of this section). The key stages in the breakthrough drilling process are depicted in FIG. 3.

The onset of breakout and its identification are key to controlling the drilling process. As the drill bit approaches the far side of the workpiece (e.g. the tissue interface in the example of drilling bone) the thinning of the workpiece immediately ahead of the drill bit leads to greater compliance and the inability to react the axial feed loads applied by the drill bit. This leads to the detected force decreasing. In addition, it has been observed that the onset of breakout is a highly non-linear process wherein the compliant material becomes very flexible as it thins. At this stage of the breakthrough process the thickness of the flexible material in front of the centre of the drill bit increases leading to a greater proportion of material removal being at the outer radii, or periphery, of the drill bit compared to the centre of the drill bit. The result is that the measured torque on the drill bit increases. Thus, it has been found that the onset of breakout can be detected by the combination of persistently decreasing force and persistently increasing torque.

The onset of breakout determines the location of the far surface 6 of the drilled material 5 and thus the amount the material has deflected and its thickness. This is an important reference point as the drill 10 is advancing into the unknown region where sensitive structures may lie. Furthermore, it is breakout that presents the challenge in terms of controlling the drill bit 10 penetration. The presence of compliance (shown schematically in FIG. 3 by feature 7) results in the deflection of the drilled material 5 under the action of the tool, such that at the onset of breakout the material 5 starts to return to its natural position. If too high a force is exerted, breakout can be drastically accelerated potentially leaving the drill bit 10 protruding significantly beyond the far surface 6.

A model can be used to illustrate the differences encountered in drilling using a constant feed force as opposed to constant feed rate control strategy. The implications of the drill tip feed control strategy that need to be considered include:

the effects on the drilling data and therefore the ability to determine the state of the drilling process and detect the onset of breakout;
the effects on the ability to control breakout;
the implications of tool safety.

The rate at which a drill bit progresses through the bone tissue is dependent upon factors such as the drill rotational velocity $\omega$, cutting efficiency represented by the cutting coefficient $\gamma$, a coulomb friction coefficient $\beta$, and the feed force $F_x$. A model combining these factors has been shown to provide an accurate representation of the drilling characteristics in bone tissue when using a constant feed rate $\dot{x}$, and low shaft speeds in the order of 20 Hz. The relationships are given by the following two equations:

$$\frac{\delta F_x}{\delta t} = \left(1 - \frac{2F_x \omega \gamma}{\pi R \dot{x}}\right)\left(\frac{1}{(\sin 2\theta_2 - \sin 2\theta_1) + 2(\theta_2 - \theta_1)}\right)$$

$$T_x = \beta R F_x \left(\frac{[\cos 2\theta_1 - \cos \theta_1]}{[2(\theta_2 - \theta_1) + \sin 2\theta_2 - \sin 2\theta_1]}\right)$$

It should be noted that the displacement $x_h$ is the current hole depth, x is the drill displacement relative to the start position $x_o$ and $x_d$ is the deflection of the surface (variables shown in FIG. 3). $x_h$ is related to the feed force and the feed rate by the equation below, where k is an approximation of the material stiffness.

$$\frac{dx_h}{dt} = \frac{dx}{dt} - \frac{d}{dt}\left(\frac{F_x}{k}\right)$$

Furthermore, the variables $\theta_1$ and $\theta_2$ give the angles subtended from the axial centre of the burr along the drill axis to the intersection of the orthogonal plane of the tissue interfaces each side of the material being drilled as shown in FIG. 3.

An equivalent model for constant feed force rather than constant feed rate is given by the equation below. The relationships between the force and torque and the force and hole depth given by the equations above remain the same. Although the relationship between force and torque is unchanged, the torque-displacement transients will differ due to the different force-displacement characteristic.

$$\frac{\delta x_h}{\delta t} = F_x \left(\frac{2\omega \gamma}{\pi R}\right)\left(\frac{1}{(\sin 2\theta_2 - \sin 2\theta_1) + 2(\theta_2 - \theta_1)}\right)$$

Figure 4:
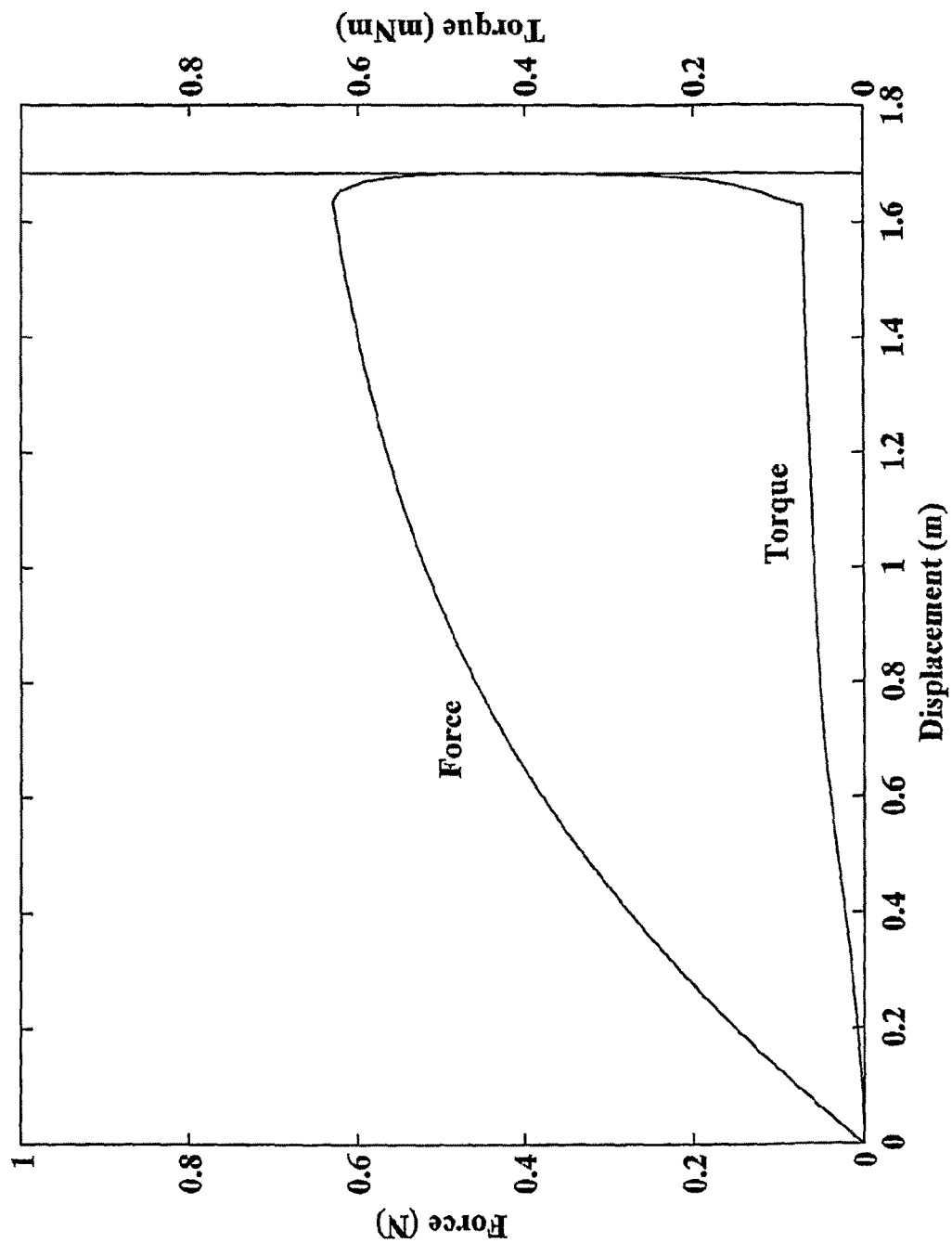
FIG. 4 is a graph of force and torque transients vs displacement for constant feed rate drilling.

To demonstrate the difference between the two control strategies of feed force and feed rate control, the equations above have been plotted in FIGS. 4-8. FIG. 4 shows the drill bit feed force and torque plotted as a function of displacement when drilling with constant feed rate.

The parameters required to evaluate the drilling model are: ω, R, k, γ, β and x. Where ω and R, the drill bit angular speed and the drill bit radius are both determined by the requirements of the application. Due to the unpredictable nature of human bone structure it is not possible to measure values for γ and β, as such these are empirically determined constants.

As illustrated by FIG. 4, the force and torque transients show three key features. Firstly, the compliance of the material manifests itself in two ways.

equilibrium drilling conditions are never reached even though the drill bit radius is less than the material thickness.

due to the deflection of the material the drill displacement exceeds the thickness of the material and the burr radius combined.

Secondly, when the drill burr has penetrated the material by a depth equal to that of the radius, R, of the burr there is an observable change in gradient in the torque transient.

Thirdly, changes in force and torque are indicative of the onset of breakout and can be used to determine the close proximity of the drill tip to the interface before breakout occurs. The rate of change of force at the onset of breakout increases rapidly as the force falls to zero. As the force falls, the torque shows a rapid increase as the cutting rate increases as a result of a shift in the location of the centroid of the reaction force.

Figure 7:
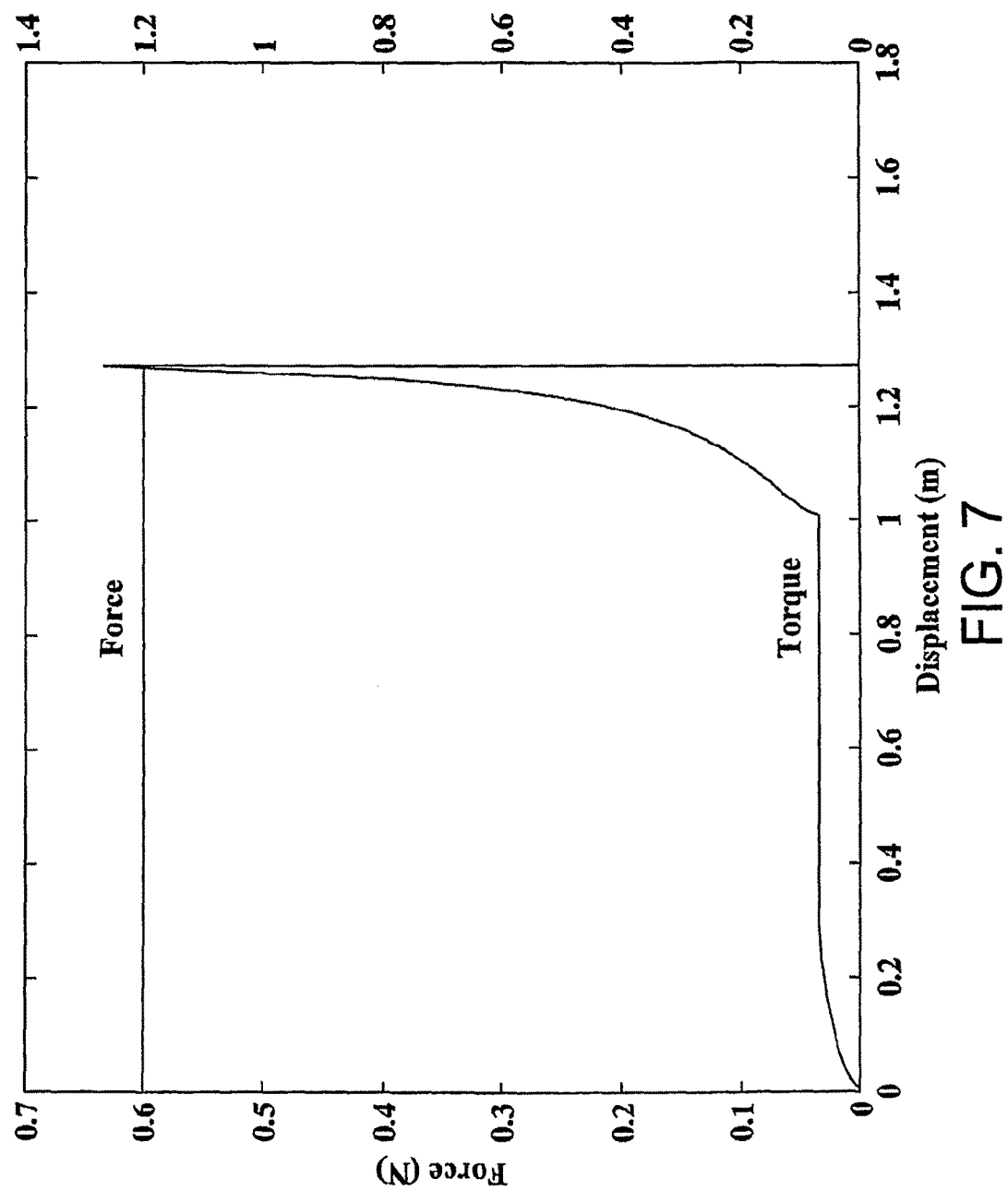
FIG. 7 is a graph of force and torque transients vs displacement for constant feed force drilling.
Figure 9:
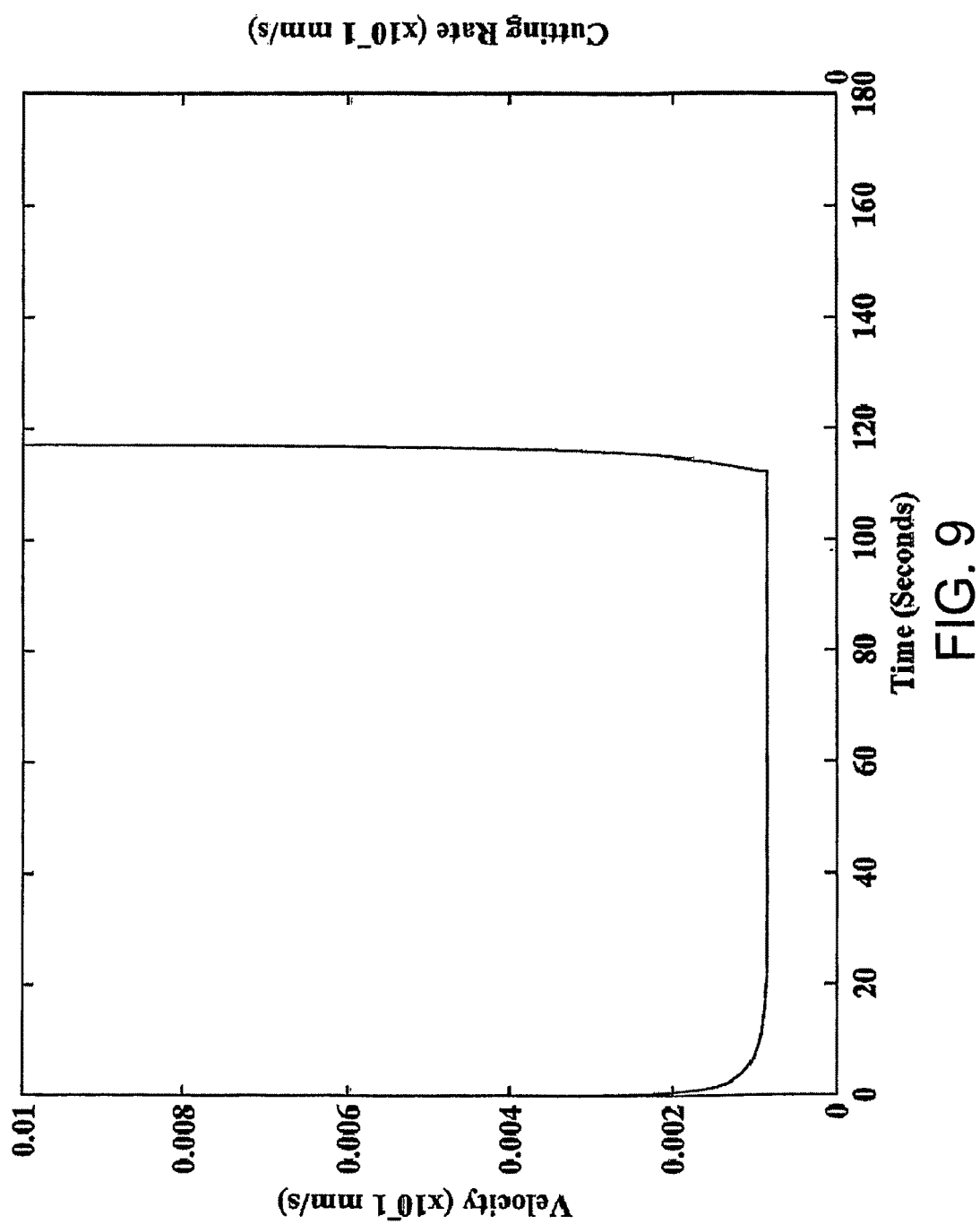
FIG. 9 is a graph of feed rate and cutting rate vs time for constant feed force drilling.

FIG. 7 shows that when using a constant feed force control strategy there are similar variations in torque. However it is worth noting that the gradient up to the point when the hole depth is equal to the burr radius (the equilibrium drilling point) falls to zero and them remains zero until the onset of breakout occurs. At this point the feed rate has to remain equal to the cutting rate in order to keep the force constant. This is not the case when using a constant feed rate strategy as the continual advancement of the drill increases the force and thus the torque. The force transients of FIGS. 4 and 7 are noticeably different in that the force profile for a constant feed force is simply a reference signal and conveys no information about the state of drilling process. Instead, the rate of feed displacement plotted as a function of time can be used to convey information on the progress of drilling as shown in FIG. 9. The rising feed rate after a period of falling or steady feed rate indicates the onset of breakout. The feed rate profile for constant feed force drilling is similar to an inverted version of the constant feed rate force profile shown in FIG. 4 and therefore conveys similar information. In terms of automatically characterising the drilling process from sensory data, the same information can be extracted from both feed strategies. In the drilling process, such information can be used to change the control strategy to maximise either performance or safety.

Figure 5:
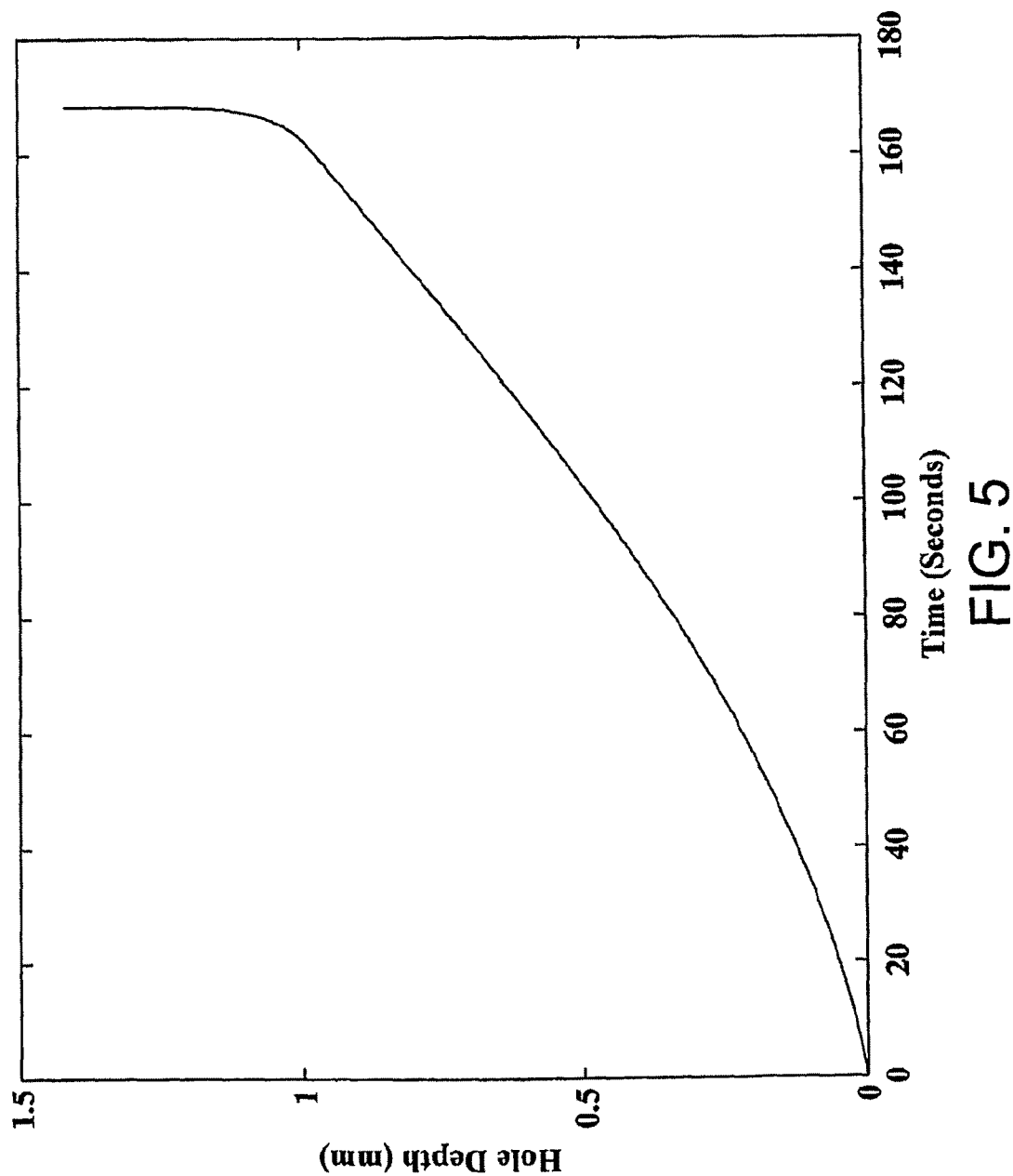
FIG. 5 is a graph of feed rate vs time for constant feed rate drilling.
Figure 6:
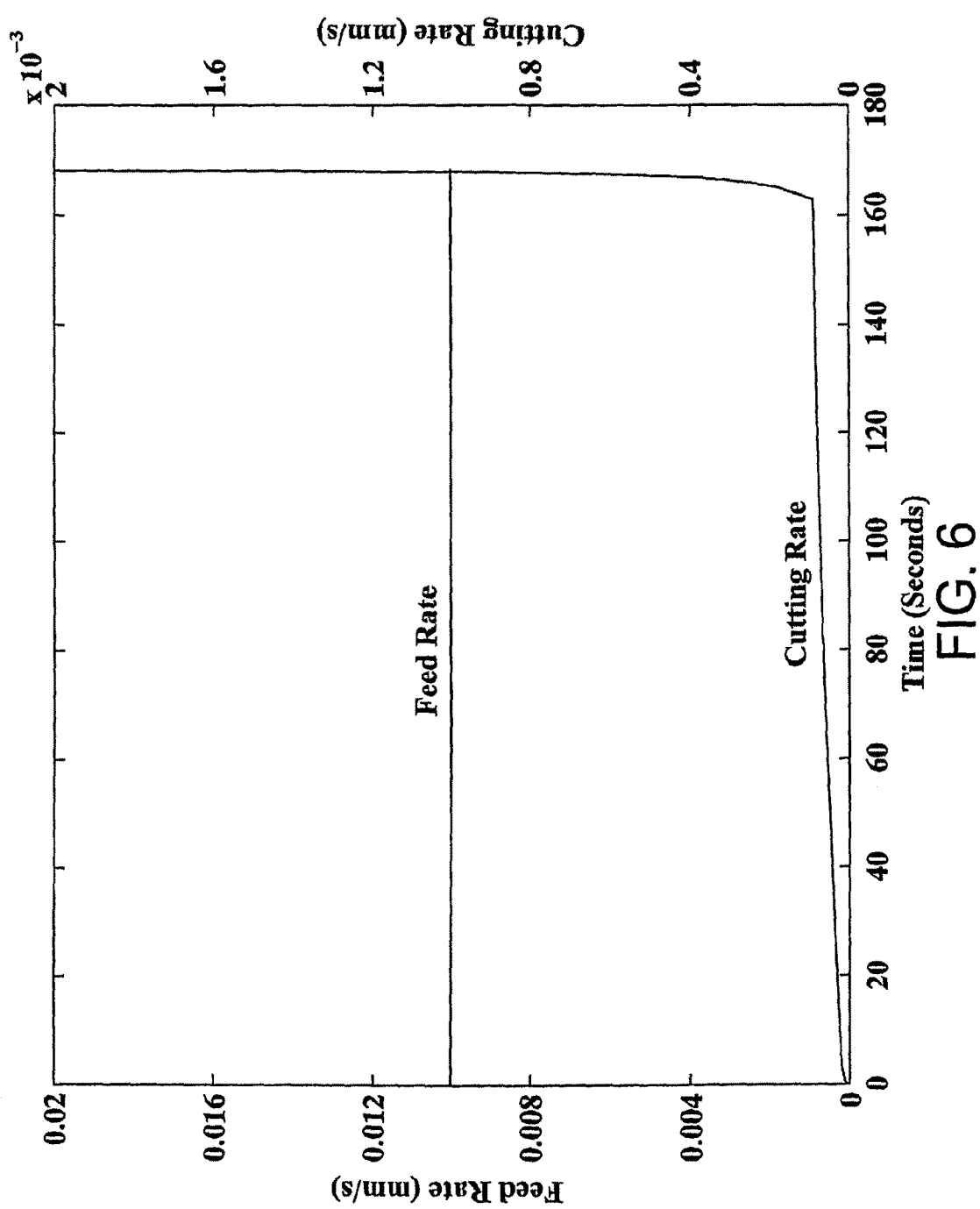
FIG. 6 is a graph of feed rate and cutting rate vs time for constant feed rate drilling.
Figure 8:
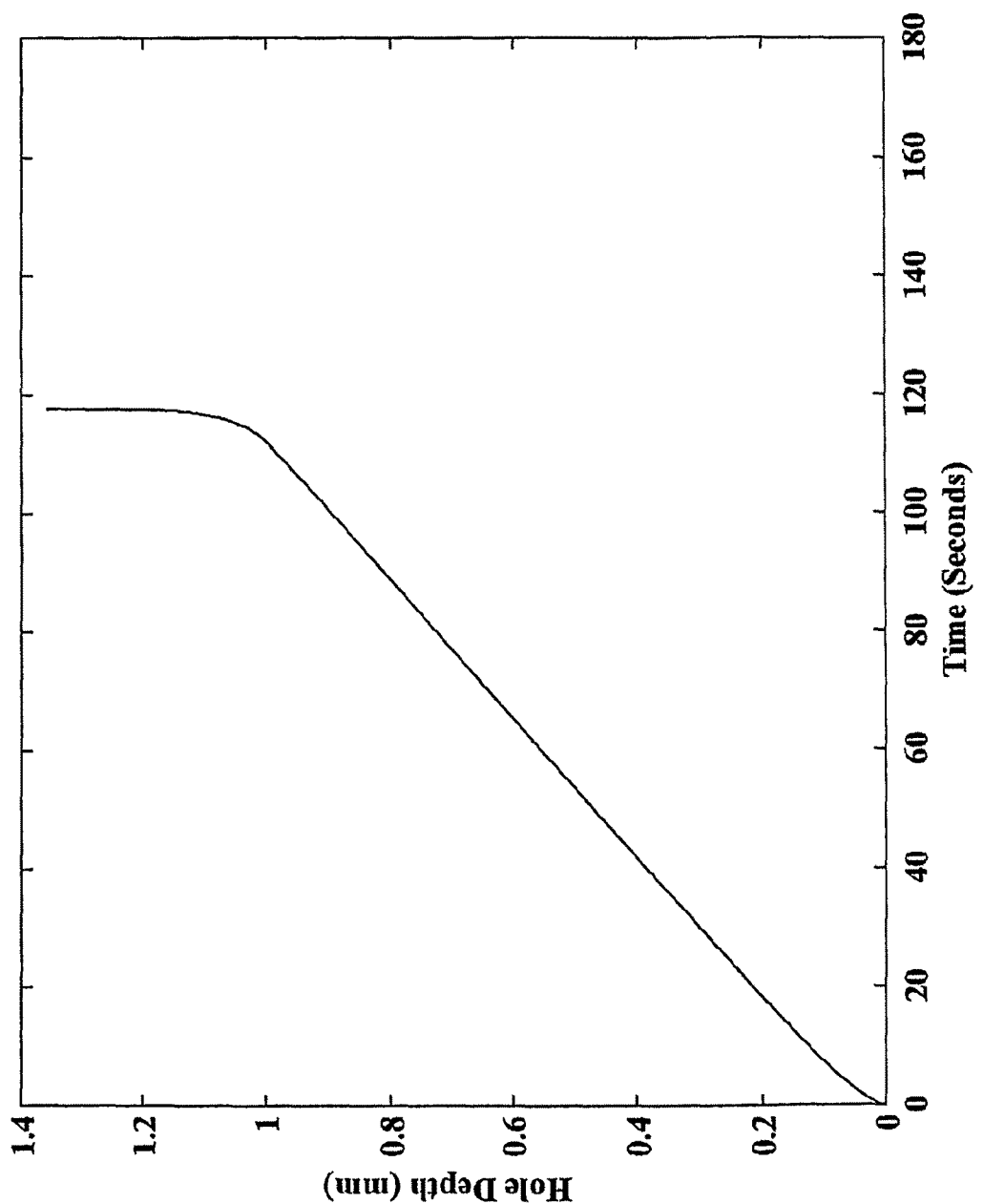
FIG. 8 is a graph of hole depth vs time for constant feed force drilling.

FIGS. 5 and 8 show the transients of drilled-hole depth for constant feed rate and feed force control strategies respectively. In both examples, the results show that hole depth increases rapidly on the approach to drill bit breakout. The shorter drilling time under the constant feed force strategy provides obvious advantages by achieving the drilling process more quickly and limiting the force exerted on the target. Set against this is the sharp feed acceleration at the onset of breakout as this reduces the time available for detecting the onset of breakout and raises the question of safety of a force control strategy in this application. At the same time when drilling tissue of unknown stiffness using a constant feed rate strategy it is possible to apply excessive force due to insufficient compliance in the material. Given the advantages and disadvantages of the two control strategies it has been found that the most desirable solution is a hybrid strategy that combines the advantages of both and removes the risk.

This can be achieved by implementing a hybrid control strategy. This strategy starts out as a constant feed rate strategy with a maximum force setting. If this setting is never reached the control strategy will remain that of the constant feed rate, however if the force limit is exceeded the constant feed force strategy takes over and vice versa. This removes the risk of sharp feed acceleration as breakout occurs. The force limitation allows the use of higher feed rates without the risk of exerting too greater force. This also significantly reduces the drilling time.

Figure 10:
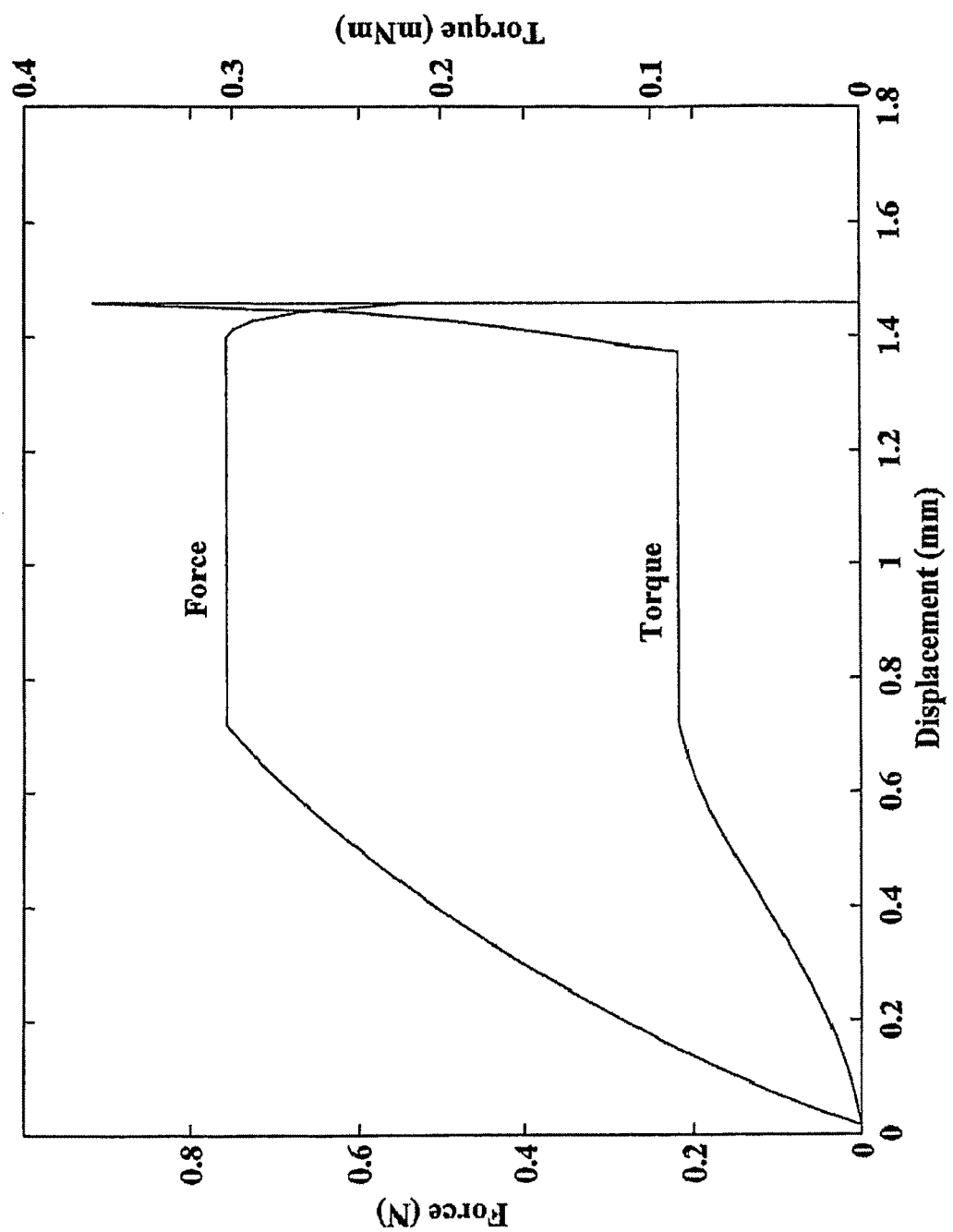
FIG. 10 is a graph of force and torque transients vs displacement for hybrid drilling.
Figure 11:
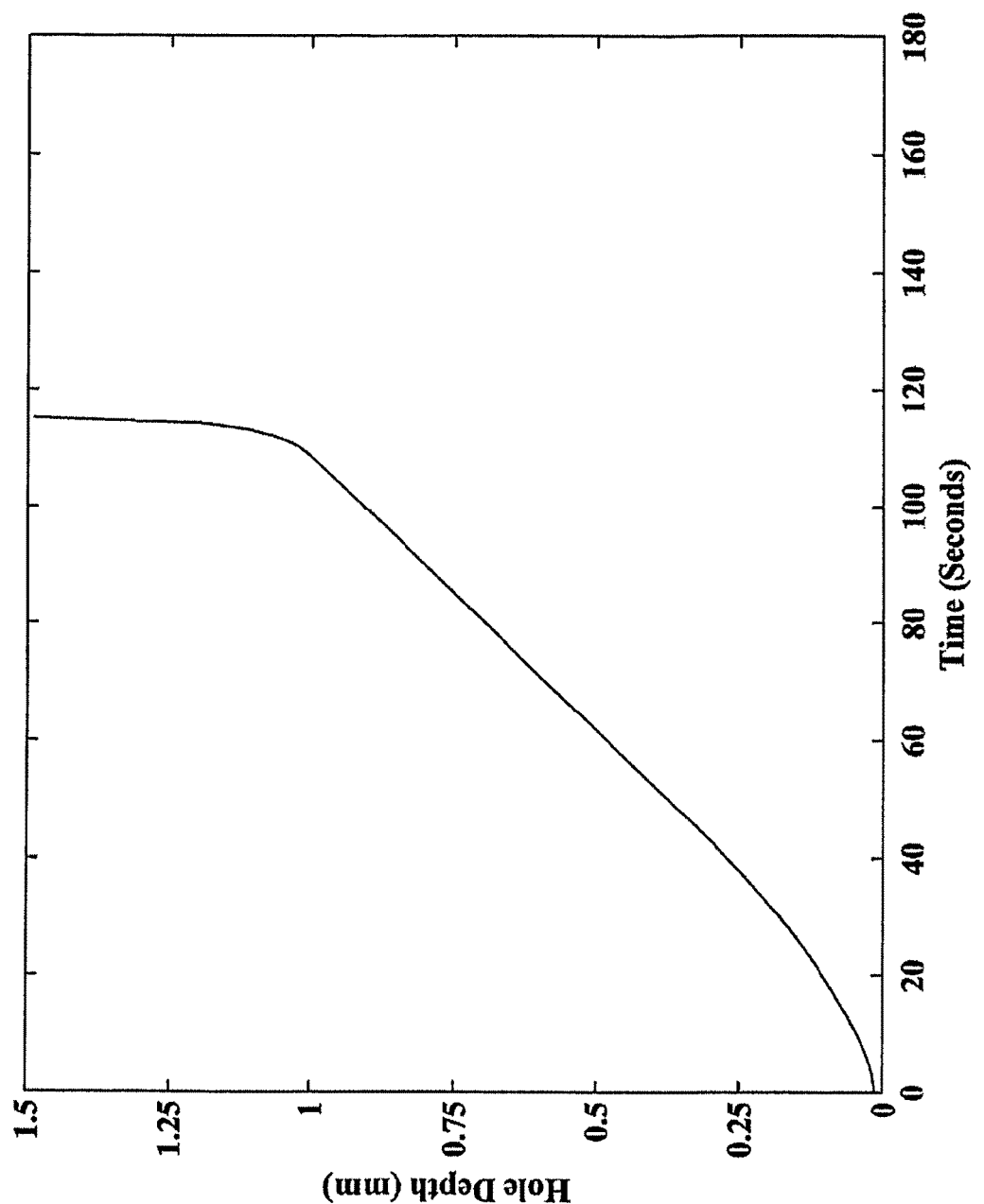
FIG. 11 is a graph of hole depth vs time for hybrid drilling.
Figure 12:
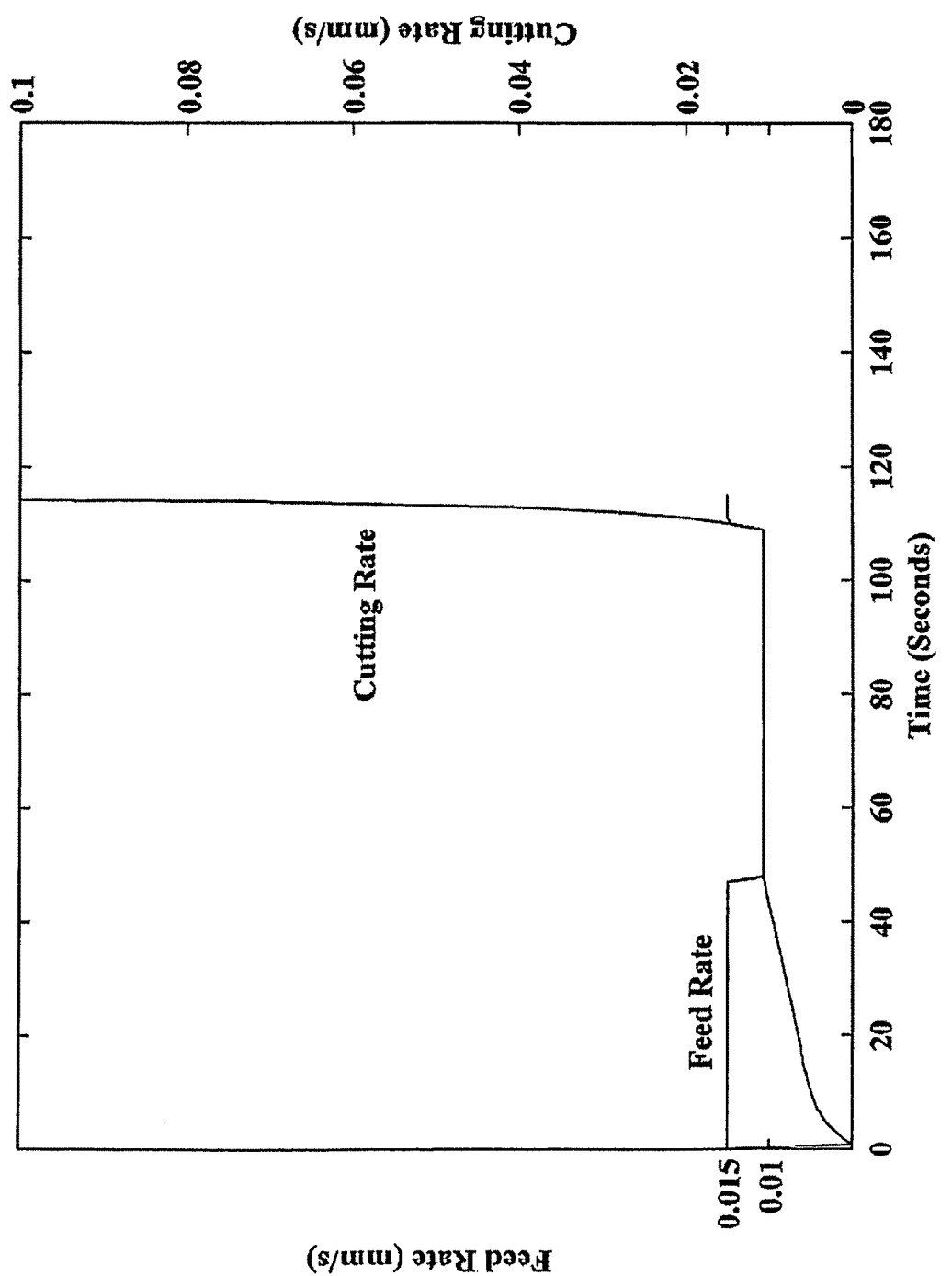
FIG. 12 is a graph of feed rate and cutting rate vs time for hybrid drilling.

FIGS. 10, 11 and 12 show simulated results using a hybrid control strategy. Comparing FIGS. 10, 7 and 4 it can be seen that FIG. 10 shares the desirable features of both control strategies. The drill time is considerably shorter that of the constant feed rate control, yet the force is limited to a maximum of 0.7 N as it would be in a constant feed force strategy. The combined strategies also reduce the rate at which breakout progresses retaining the sharp roll-off you would expect in the constant feed rate force transient, as do the other transients (See FIGS. 11 and 12). This increases the amount of data available to accurately detect the onset of breakout.

As a further implication, FIGS. 5 and 8 illustrate a significant problem when drilling manually in critical or delicate situations. As the target surface is reached and breakout starts to occur, breakout advances rapidly. The fast and accurate response required to avoid excessive penetration of the tool point is typically beyond that achievable by human response to tactile stimulus. Therefore an automated tool action is most appropriate for controlling breakthrough in these applications.

Control Schemes

In view of the critical drill breakthrough process, the overall drilling strategy is separated into two stages:

from the start of drilling to the onset of breakout;

from the onset of breakout to its completion.

There is the need to automatically identify each stage and to control the motion of the drill bit 10.

The method described advantageously also includes a method for eliminating noise, whilst attempting to identify the features indicating the commencement of the breakout process. In FIG. 4 it is illustrated that the rate of change of the gradient of the curve plotted changes markedly as breakout commences. Monitoring the drilling data for sudden increases in the rate of change of the data gradients is a principal means of detecting the onset of breakout. This method of breakout detection can be implemented in more than one way. Most simply it can be implemented by applying thresholds directly to the rate of change of the data gradients, however it has been found that sudden changes in the transients were not easily distinguishable from noise leading to a high percentage of false positive detections. This could only be addressed by increasing the gradient thresholds with the knock on effect of breakthrough being completed before being detected. A further means was found necessary to discriminate between noise and the breakthrough features. It has been found that the history of the sensory data signals can be advantageously considered.

Signal Conditioning

By the very nature of the application and given the scale of the features that are key to successful detection a low signal to noise ratio reduces the effectiveness of any method used.

Different noise reduction schemes were explored. Several factors had to be considered when looking at improving the signal to noise ratio:
- computational efficiency;
- memory footprint;
- feature attenuation;
- phase shift The first two items are a result of limitations of the hardware controller, the later two are design limitations of the filters themselves. The filter has to be implemented in the firmware of the device and as such a faster, more computationally efficient algorithm is desirable.

High frequency noise is the biggest problem, most of which is generated by three main sources.

The torque is derived from the drive motor current, which is in turn is driven by a PID velocity loop. This has the effect of introducing noise due to the PID loop refresh rate at approximately 1 khz. This is exaggerated by the control function. To achieve optimum velocity control large swings in motor current are generated as the control loop maintains the desired velocity. As such the PID loop is tuned to give an acceptable level of velocity control, while still maintaining the signal integrity.

The second source is the cutting faces of the burr interacting with the tissue. This occurs at approximately six times the rotational velocity of the drill bit.

The third source is a quantisation effect due to the use of an analogue to digital conversion combined with the effect of the sampling frequency. Other sources include noise from bearings and ambient noise. Breakthrough occurs at sufficiently low frequency that it can be considered a DC signal and as such is not affected greatly by the attenuation introduced by heavy filtering, phase shift however presents a problem.

Simple 1st and 2nd order low pass recursive filters (e.g. Butterworth and Chebychev) are effective at reducing noise however the phase shift in the transients is unacceptable. These filters are also very computationally inefficient. The most effective method found was a recursive n-sample moving average filter. However this also introduces a high degree of phase shift. Therefore a non-recursive n-sample moving average filter was used. Even though this algorithm has large memory foot-print, it is incredibly efficient. A side benefit from having a large memory footprint is that the historic data is always available for use by other algorithms. The use of this type of algorithm enables breakout detection to function in real-time and the use of a non-recursive filter means there is zero phase shift. The algorithm is represented by the equation below, where F is the input data, $\overline{F}$ is filtered out-put value, n is the current sample, i is the $i^{th}$ sample in the filter window and k is the filter window width. (The example shown is for the force signal, the algorithm for the torque signal is identical.)

$$\overline{F}_n = \frac{1}{k}\left(\left[\sum_{i=n-k}^{n} F_i\right] - F_{n-k} + F_n\right)$$

Mean Deviation Detection Method

Given that noise in the drilling data is unavoidable and that data will also include variations due to the non-uniform nature of natural materials such as bone, statistical methods can help to reduce the effect of these on the data. The method described incorporates noise filtering and variation tolerance. It also enables the analysis of an approximation of the transient gradients without the need to differentiate the data. This method functions by comparing the variance of the current transient value with the mean of the previous samples of the filtered signal. This provides an approximate magnitude that represents the rate of change of the parent signal. Applying the same technique again to the magnitude signal gives an approximation of the rate and direction of the magnitude signal. The use of the mean of the previous n samples dramatically improves the signal to noise ratio. Combined with the signal conditioning, this effectively eliminates the effect of the high frequency noise. The use of the mean of the previous n samples has another benefit in that it increases the sensitivity of the detection method as the deviance from the mean is often greater that from, for example the previous sample. As such, large changes in the rate of change of the parent signal are exaggerated and small fluctuations as a result of noise can be ignored. This not only allows the system to detect the onset of breakout, it enables it to differentiate between different types of contact that the drill may encounter, for example:
- workpiece moving away from the drill;
- workpiece moving towards the drill;
- drill crossing a workpiece interface;
- drill crossing into free space;
- and the onset of breakout condition;

The transient mean deviation magnitude and rate of change are calculated using the two equations below respectively, again using force as an example, the torque values are calculated using the same method.

$$F'_n = \overline{F}_n - \left(\frac{1}{j}\sum_{i=n-j}^{n} \overline{F}_i\right)$$

$$F''_n = F'_n - \left(\frac{1}{j}\sum_{i=n-j}^{n} F'_i\right)$$

Where $\overline{F}$, is the filtered reference signal, F' is the mean deviation magnitude and F" is the rate of change of the magnitude. F' is the change in the filtered output value computed at the latest sample time, compared with the previous filtered average over the filter width—determined by the number of samples, j, included in the filter. Therefore F' is an indication of the rate of change of the force, F throughout the sampling process. Where the sample period is maintained constant F' is an indication of a derivative value of F. However, the present invention can be used with a non-constant sampling period if desired.

The onset of breakout is detected when both of the following criteria are satisfied:

$$F'_n < F_{lim} \text{ AND } F''_n \leq 0$$

$$T'_n > T_{lim} \text{ AND } T''_n \geq 0$$

Where $F_{lim}$ and $T_{lim}$ are predetermined force and torque mean deviation thresholds based on the applications desired hole depth, minimum level of protrusion and the material properties. These values are empirically determined using laboratory results.

The primary conditions are $F'_n < F_{lim}$ and $T'_n > T_{lim}$. These terms indicate when the gradient of the force torque data exceeds a predefined value, i.e. it aims to identify the start of the rising torque feature that occurs at the onset of breakout. Since there are fluctuations that can have similar characteristics to the breakout characteristics in both the force and the torque transients, using the force or torque alone would frequently result in premature false positive breakthrough detections. The use of the two signals combined drastically reduces the false positive detection rate to less than one percent. As breakout is approached the force mean deviation will tend to zero and then rapidly swing negative, satisfying the force criteria. This holds true for the torque mean deviation as this will also tend to zero as breakout is approached, it will then rapidly swing positive satisfying the torque criteria.

The $F''_n \leq 0$ and $T''_n \geq 0$ conditions are based on the fact that the force gradient reduces sharply and the torque gradient increases sharply following the onset of breakout. $F''_n \leq 0$ is true and $T'' \geq 0$ is false from shortly after the start of drilling due to the slight decrease in gradient of both transients during drilling up to the onset of breakout. These two conditions do not play a part in breakout detection as such, rather they are included to eliminate the occurrence of false positive detections and differentiate between alternative types of features that may be present. This means that if the force continues to rise for a short period after the onset of breakout (e.g. if equilibrium drilling was not reached prior to the start of breakthrough) this condition does not delay the detection of the onset of breakout as identified by the $F''_n \leq 0$ condition, as even though the force is increasing it will be at a falling rate such that the rate of change will be negative. Similar is true for the torque condition $T''_n \geq 0$, if the torque increase is delayed for any reason and the signal falls, but at a reducing rate the torque condition will still be satisfied. This has the effect of reducing the likelihood of false positive breakout detection as opposite fluctuations such as this (force decreasing and torque increasing) in the force and torque data sets rarely coincide sufficiently to satisfy both conditions. For example if the workpiece was to move away from the drill, whether it be due to compliance or the workpiece physically moving backwards, both the force and torque would fall rapidly. However if the motion was to suddenly stop the torque would spike as the drill begins cutting again, the resulting jolt in the force would also produce a spike in the gradient which could be interpreted as the onset of breakout as both thresholds would be satisfied. However, the direction in which the thresholds would be crossed is opposite to that of the onset of breakout, so by taking into account the direction in which the transient is travelling it is possible to eliminate most false positive detections.

Drill System in Practice

In use, the drill is manually positioned by the surgeon on an approximate trajectory to reach the target area. Using a surgical microscope with the aid of the adjustment mechanism 2, the trajectory is adjusted so the hole will be drilled in the correct position. The clinician then initiates the contact process using the hand held remote control 32. The system then advances until the surface is found, then retracts until the force is below 0.01N indicating that the burr is positioned on the surface of the workpiece (as shown by picture 1 in FIG. 3). The system then waits for clinician to initiate the drilling process. If the clinician is at all unhappy with the hole position the drill can be retracted/advanced using the remote 32. If the system experiences a force >0.01 N it is automatically placed in contact mode and the system adjusts so the burr 11 is sat on the surface. This prevents the clinician accidentally exerting any force on the workpiece.

The drilling process is initiated, again, by the clinician via the remote control 32. This starts the investigative drilling process (picture 2 in FIG. 3) in which the system drills until the onset of breakout is detected. Equilibrium drilling may or may not be achieved depending on the characteristics of the workpiece. The breakout detection method uses the drilling force, torque and displacement feedback to monitor the progress of the drilling to identify the onset of breakout. If a feed force or hybrid control strategy is being used the force is separately monitored to ensure it does not exceed the set maximum force, as the maximum force is approached the feed rate is adjusted accordingly.

On identifying the onset of breakout, the drilling process is promptly moved to the third stage of the drilling control sequence, breakthrough control.

The control of the drill is determined by the breakthrough control strategy during this stage and leads to the controlled completion of the hole with minimal protrusion of the drill bit beyond the far surface of the drilled material. As soon as the onset of breakout is detected drill rotation is ceased and the drill unit 1 is retraced until the axial force on the drill tip 11 reaches zero. When the force reaches zero, it is assumed that the workpiece 5 has returned to its natural position and the burr 11 is sat on the inner surface of the hole (picture 3 in FIG. 3). It is at this point that it is possible to determine the material thickness, deflection and stiffness. Using these parameters, the system determines the control parameters required to complete the hole with the required level of protrusion.

When the onset of breakout is detected the degree of completion at this point can be controlled using the force and torque mean deviation thresholds—the higher the thresholds the greater the degree of completion. This allows the clinician a degree of control over the procedure. If required the thresholds can be set so there is no perforation at this point in the process. If a complete hole is required it will be necessary to commence to the next stage of drilling in which when initiated the drilling velocity is reduced to 10 rev/s and the drill unit is advance by the radius of the cutting burr (picture 4 in FIG. 3). The drilling process is then completed under the force of the tissue returning to its natural position ensuring the protrusion is limited to the radius of the burr.

In the case of drilling a cochleostomy, an 80% complete hole is desirable as the thin section of bone that remains as the base of the hole helps to retain the electrode in position once it is inserted. In this instance it is possible to achieve an 80% complete hole in the first instance of drilling by adjusting the threshold parameters. Not completing the hole also offers a higher chance of not penetrating the membrane that surrounds the internal wall of the cochlear as it is the acceleration of the drill rotation that tends to tear them delicate membrane. The risk of this can be reduced further by reducing the speed at which the hole is completed, thus increasing the drilling time.

Figure 13:
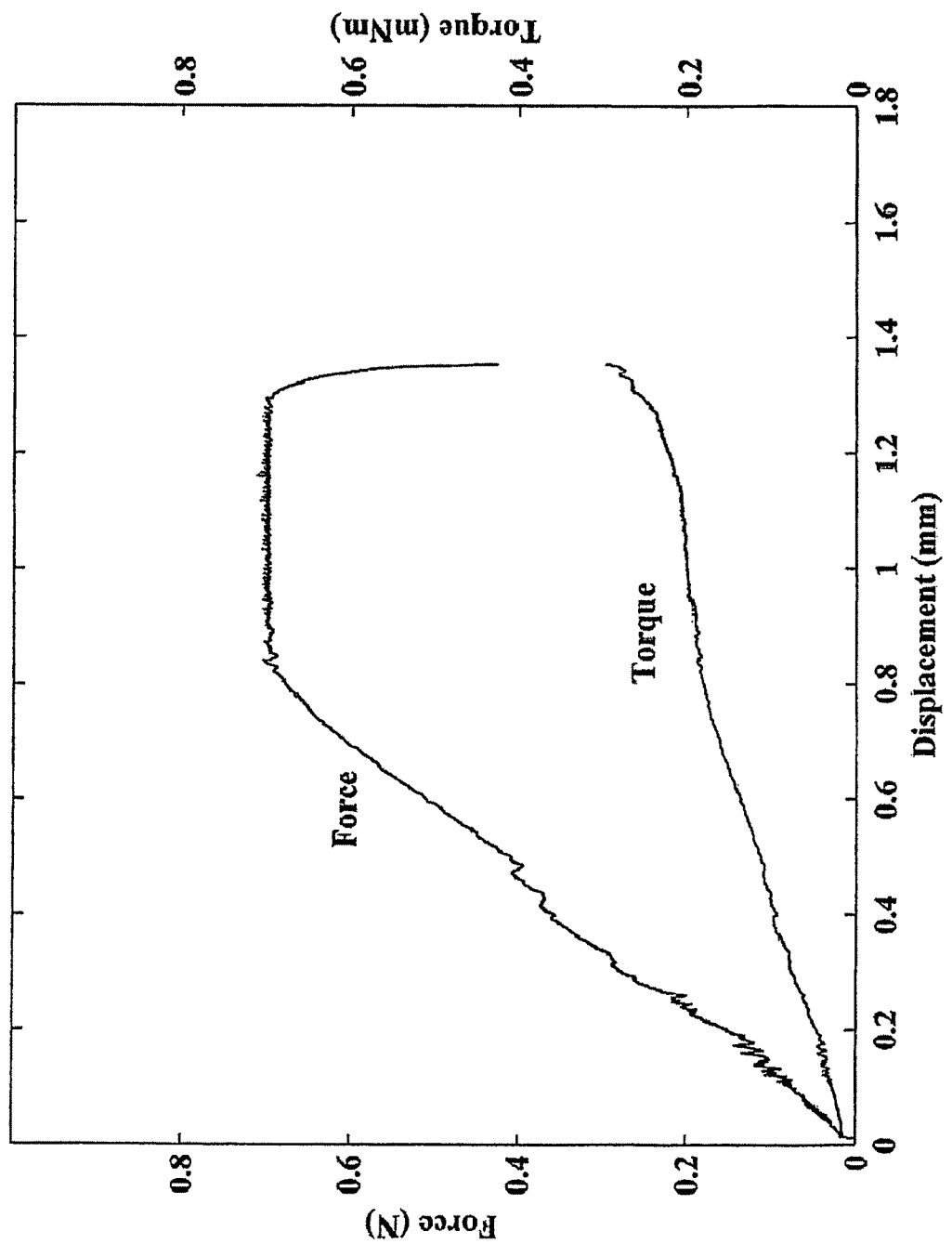
FIG. 13 is a graph of actual force and torque transients vs displacement for hybrid drilling under experimental conditions.

Using the control stages described, the drilling force and torque curves of FIG. 13 were produced during an experimental trial on a porcine cochlear.

The drill feed advances at a constant rate until the onset of breakout is detected by using data from the force and torque curves. The drill 10 then retracts to reduce the applied axial force to zero. At this point the cochlear adopts its neutral position with the drill tip 11 on the distal surface. Through this method, drill position beyond the compliant distal surface was achieved within a tolerance of 1 μm of the desired position.

Detection to within 10 μm (2% of the drill bit radius) prior to the interface has been achieved with a strong signal to noise ratio in the sensory transients providing a false positive detection rate of less than 1%.

What is claimed is:

1. A method of drilling a hole in a workpiece in order to control breakthrough of the workpiece comprising the steps of:
   a) initiating contact between a drill bit of a drill unit and the workpiece;

b) operating the drill unit to rotate the drill bit to drill the workpiece;
c) during drilling of the workpiece measuring the force, F, and torque, T, experienced by the drill bit;
d) calculating a variable F', based on the measured force, F, representing the rate of change of F;
e) calculating a variable, T', based on the measured torque, T, representing the rate of change of T;
f) calculating a variable F" representing the rate of change of F';
g) calculating a variable T" representing the rate of change of T';
h) detecting the onset of breakout of the workpiece by use of the variables F', F", T' and T";
i) thereby controlling the speed of rotation of the drill bit during breakthrough of the workpiece to control the degree of breakout of the drill bit from the workpiece.

2. The method of claim 1 wherein the onset of breakout of the workpiece is detected when both of the following criteria are satisfied:

$$F'_n < F_{lim} \text{ AND } F''_n \leq 0$$

$$T'_n > T_{lim} \text{ AND } T''_n \geq 0$$

where the notation "n" indicates that these variables are calculated relative to a current sample, and $F_{lim}$ and $T_{lim}$ are predetermined thresholds based on the desired hole depth, minimum level of protrusion and the workpiece's material properties.

3. The method of claim 1 wherein F' and T' are the mean deviation magnitudes of F and T respectively.

4. The method of claim 3 wherein variables F' and T' are calculated using filtered values of F and T respectively, wherein F and T are filtered using a non-recursive n-sample moving average filter to produce moving averages F̄ and T̄.

5. The method of claim 4 wherein the mean deviation magnitude of F is represented by:

$$F'_n = \overline{F}_n - \left( \frac{1}{j} \sum_{i=n-j}^{n} \overline{F}_i \right)$$

where the notation "n" indicates that these variables are calculated relative to a current sample, and the notation "j" indicates the total number of samples in the filter.

6. The method of claim 4 wherein the mean deviation magnitude of T is represented by:

$$T'_n = \overline{T}_n - \left( \frac{1}{j} \sum_{i=n-j}^{n} \overline{T}_i \right)$$

where the notation "n" indicates that these variables are calculated relative to a current sample, and the notation "j" indicates the total number of samples in the filter.

7. The method of claim 5 wherein F" is represented by:

$$F''_n = F'_n - \left( \frac{1}{j} \sum_{i=n-j}^{n} F'_i \right)$$

8. The method of claim 5 wherein T" is represented by:

$$T''_n = T'_n - \left( \frac{1}{j} \sum_{i=n-j}^{n} T'_i \right)$$

9. The method of claim 1 further including the step of measuring the linear displacement of the drill bit.

10. The method of claim 1 wherein on detection of the onset of breakout of the workpiece, the drill bit is retracted until F equals zero.

11. The method of claim 10 wherein subsequently drilling of the workpiece recommences and the drill bit is advanced by a fixed linear distance in order to complete the hole to a desired depth or percentage of hole completion.

12. The method of claim 11 wherein the fixed linear distance is calculated as a proportion of a characteristic dimension of the drill bit.

13. The method of claim 12 where the fixed linear distance equals the radius of a burr of the drill bit where the burr is substantially hemi-spherical or spherical.

14. The method of claim 1 wherein immediately after step a) the drill bit is retracted until F is less than or equal to 0.01N to thereby ensure the drill bit is accurately located at the surface of the workpiece.

15. The method of claim 1 wherein immediately after step a) the drill bit is advanced a fixed distance and the force experienced by the drill bit is detected in order to calculate the compliance of the workpiece.

16. The method of claim 1 wherein a hybrid control strategy is implemented wherein the drill bit is initially advanced at a constant feed rate until either the onset of breakout is detected or a predetermined maximum threshold force is experienced by the drill bit; where the predetermined maximum threshold force is experienced by the drill bit the drill bit is thereafter advanced at a constant feed force.

17. The method of claim 1 wherein the drilling of the hole is stopped with no breakout.

18. The method of claim 1 wherein the drilling of the hole is stopped after a partial or complete through hole is formed.

19. The method of claim 1 wherein the drill unit is hand-held.

20. The method of claim 1 wherein the workpiece is compliant.

21. The method of claim 6 wherein F" is represented by:

$$F''_n = F'_n - \left( \frac{1}{j} \sum_{i=n-j}^{n} F'_i \right)$$

22. The method of claim 6 wherein T" is represented by:

$$T''_n = T'_n - \left( \frac{1}{j} \sum_{i=n-j}^{n} T'_i \right)$$

23. A drilling system comprising a drill unit and a controller; the drill unit comprising:
i) a drill bit,
ii) a force sensor for sensing a force, F, experienced by the drill bit; and
iii) a torque sensor for sensing a torque, T, experienced by the drill bit;

the controller comprising:
a) processing means programmed to calculate a force variable, F', based on the rate of change of the sensed force, F, a torque variable, T', based on the rate of change of the sensed torque, T, a variable, F", based on the rate of change of F', and a variable, T", based on the rate of change of T';
b) velocity control means for controlling the speed of rotation of the drill bit dependant on the variables F', F", T' and T".

24. A drilling system as claimed in claim 23 wherein the drill unit comprises a linear actuator for providing controlled linear movement of the drill unit when the drill unit is mounted to a support.

25. A drilling system as claimed in claim 23 wherein the drilling system is a hand-held drilling system.

26. A drilling system as claimed in claim 23 wherein the force sensor comprises a non-contact deflection sensor.

27. A drilling system as claimed in claim 23 wherein the torque sensor comprises means for detecting motor velocity and motor current.

28. A drilling system as claimed in claim 23 wherein the drill bit is a surgical micro-drill bit for drilling bone.

29. A drilling system as claimed in claim 23 wherein the drill bit is a needle or other rotatable member capable of being rotated to bore a hole.

* * * * *